United States Patent [19]

Seng

[11] Patent Number: 4,625,920
[45] Date of Patent: Dec. 2, 1986

[54] ROTARY DISTRIBUTOR

[75] Inventor: Stephen Seng, Bladensburg, Ohio

[73] Assignee: Owens-Corning Fiberglas Corporation, Toledo, Ohio

[21] Appl. No.: 251,017

[22] Filed: Apr. 3, 1981

[51] Int. Cl.⁴ .............................................. A01C 17/00
[52] U.S. Cl. .................................. 239/651; 239/665; 239/687
[58] Field of Search ................... 239/7, 651, 665, 666, 239/681, 687, 688; 414/299, 301, 786

[56] References Cited

U.S. PATENT DOCUMENTS

| 3,045,840 | 7/1962 | Donelson, Jr. | 414/301 |
| 3,064,833 | 11/1962 | Von Ruden | 414/301 |
| 3,411,643 | 11/1968 | Cymara | 239/666 |
| 3,446,372 | 5/1969 | Roach | 414/299 |
| 3,488,007 | 1/1970 | Neuenschwander | 239/687 |
| 3,620,390 | 11/1971 | McKinnon | 239/687 |
| 3,972,686 | 8/1976 | Johnson et al. | 239/687 |
| 3,989,194 | 11/1976 | Parker | 239/687 |
| 4,040,529 | 8/1977 | Wurdeman et al. | 414/301 |

Primary Examiner—Joseph F. Peters, Jr.
Assistant Examiner—Michael J. Forman
Attorney, Agent, or Firm—Ronald C. Hudgens; Patrick P. Pacella; Thomas F. McGann

[57] ABSTRACT

Apparatus and method for distributing particulate material substantially evenly over a square receiving area are disclosed, the apparatus comprising a rotatable trough having a discharge slot positioned along its length.

4 Claims, 3 Drawing Figures

ROTARY DISTRIBUTOR

TECHNICAL FIELD

This invention relates to a method and apparatus for distribution of particulate material.

In one of its more specific aspects, this invention relates to rotating apparatus for distributing pellets evenly over a predefined area.

BACKGROUND OF THE INVENTION

In many processes, it is desirable to distribute particulate material over a predefined surface area. One instance of this type involves the distribution of particles over grates on which the material is retained while being dried. A specific application of this procedure involves the pelletizing of particulate matter and the distribution of these pellets on a predrying grate. Stationary cones have been used for such distribution but such cones are sensitive to alignment, pellet flow pattern and build-up of material. By contrast, the present invention is not sensitive to any of these factors.

SUMMARY OF THE INVENTION

According to the present invention, there is provided a rotary distributor comprising a trough, rotatable means angularly afixed to said trough, said trough having an opening therein along a substantial portion of the length of its bottom wall.

Also, according to this invention, there is provided a method of distributing particulate material which comprises introducing particulate matter into a rotatable trough angularly afixed to rotatable means and rotating said trough to discharge said particulate material from said trough at its discharge end and from an opening extending linearly along the bottom of said trough.

In the preferred embodiment of this invention, the opening is a truncated cone-shaped slot extending from the discharge end of the trough to a locus proximate the shaft.

In another embodiment of this invention, the truncated cone-shaped slot is adapted with means, such as a gate and rails, for altering the size thereof.

The distributor of this invention is suitable for distributing any particulate of any size over any area. It is particularly suitable for distributing pellets over a square area to a uniform depth. For example, given a receiving area of from about two feet square to about 5 feet square, this apparatus will distribute evenly over the area with a variation in depth of only one-half inch in height.

Typically, the particulate matter to be distributed will be introduced downwardly into a conduit, of preferably, a semi-circular trough which is positioned a preselected distance above the receiving area and centrally thereover. The material is introduced circumferentially of the rotatable shaft from which the distributor trough depends.

The distributor trough is rotated at any suitable speed within, for example, the range of about 30 to about 200 RPM. As the particulate matter flows out of the distributor trough from its lower end, the particulate matter is projected outwardly onto the receiving surface. A principal portion is projected from the extremity of the distributor trough with that distributed proximate the center of the receiving surface being discharged through a slot, preferably having a truncated cone-shape, opening proximate the shaft and extending to the discharge edge of the distributor trough.

Inasmuch as the portion of the particles distributed centrally of the receiving surface will vary depending upon the rotational speed of the distributor and the size and mass of the particles being distributed, some adjustment of that length of the truncated cone-shaped opening may be necessary. This is done by altering the position of a gate, interrelated to retaining rails, along the length of the truncated cone-shaped opening. Preferably, the truncated cone-shaped opening will extend from proximate the shaft, at which locus it will be equal in width to about the diameter of the shaft, to the discharge edge of the distributor, at which locus the width of the opening will be equal to about one-third of the circumference of the pipe forming the distributor.

Any shape distributor can be used. Preferably, it will be formed of a segment comprising one-half of a pipe. The diameter of the pipe selected should be such that, considering the rotational speed of the distributor and the size and mass of the particles being distributed, the discharge from the distributor will be made across about one-half of the discharge surface provided. Pipe having a diameter within the range of from about 4 to about 12 inches can be used, it only being necessary that the pipe be of sufficient diameter as to retain the feed to it from flowing over its sides.

DESCRIPTION OF THE DRAWINGS

The method and apparatus of this invention will be more easily understood by reference to the attached drawings in which.

DETAILED DESCRIPTION

Figure 1:
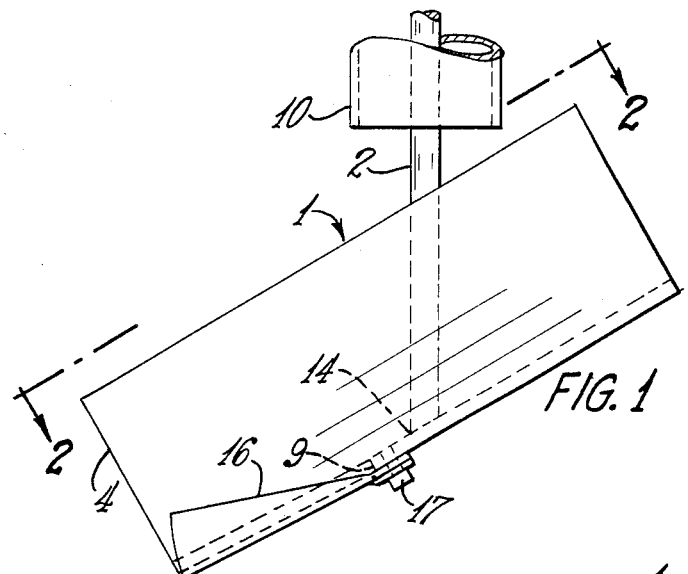
FIG. 1 is a side elevation of the distributor.

Referring now to FIG. 1, there is shown in side elevation, trough 1 formed of a semi-cylindrical pipe section afixed and supported in any suitable manner, by shaft 2. Shaft 2 is preferentially positioned centrally of introductory conduit means 10. The trough is disposed angularly downward from the centerline of the vertically-positioned shaft with the discharge end 4 being below the horizontal.

Figure 2:
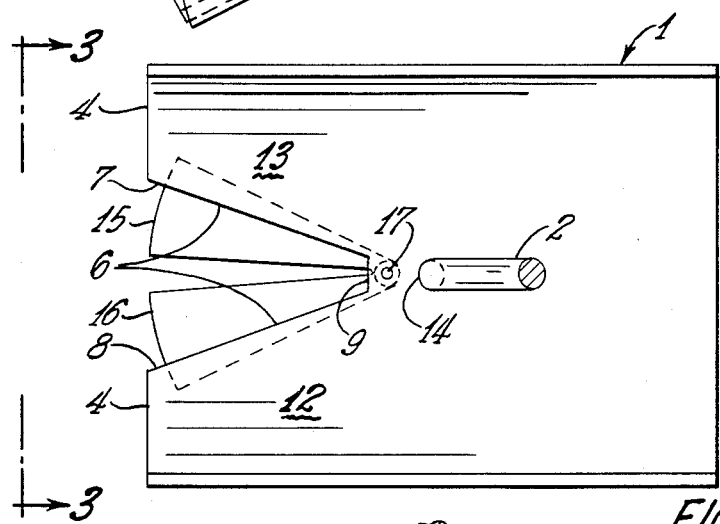
FIG. 2 is a plan view of the distributor along 2—2 of FIG. 1.
Figure 3:
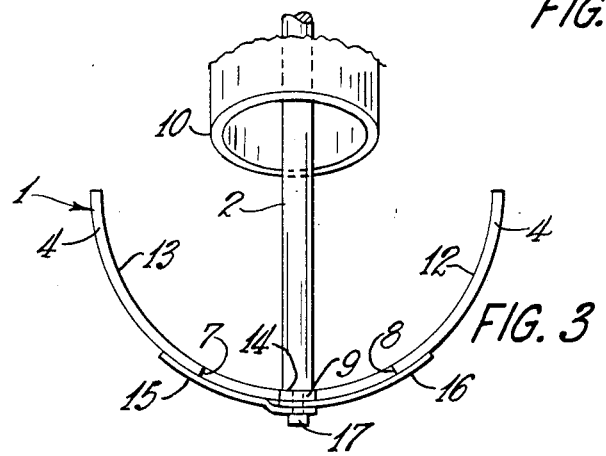
FIG. 3 is an end view of the distributor trough along 3—3 of FIG. 2.

As seen from FIG. 2, the discharge end 4 of the distributor trough forms the base of the truncated cone-shaped opening 6 formed of sides 7 and 8 and truncated terminus 9. Sections 12 and 13 positioned on opposite sides of opening 6 are of substantially equal width with terminus 9 positioned proximate the contact point 14 between shaft 2 and the trough 1.

Positioned beneath opening 6 are adjustable closure members 15 and 16 operable in a scissors-like mode to govern the effective size of opening 6 and locked in such position by a screw 17.

The rotary distributor trough spreads material independently of any preferential distribution of flow from the feed pipe and independently of any material size distribution. Material leaving the trough has a given trajectory with the particles being distributed hitting the sides of the box above the "full" level and dropping downwardly into the box. This action fills the periphery of the box.

A combination of variables is involved in determining the various aspects of the rotary distribution system.

However, given various factors as selected, the remaining factors in the design of the system can be determined by the combination of formulas $$W = ((2V \cos \phi (T) \pm 2L \cos \phi)$$

and $$T = \frac{-(V \sin \phi) \pm \sqrt{(v_2 \sin \phi)^2 + 2gH}}{g}$$

wherein
- W = the width of the box in feet
- V = velocity of the material leaving the distributor, in feet per second
- $\phi$ = the angle of inclination of the distributor from the horizontal
- T = a constant within the range of from 0.01 to 0.2 seconds
- L = the length of the trough from the vertically-positioned shaft to the discharge end of the distributor, in feet
- g = acceleration of gravity in feet per second$^2$
- H = the vertical distance of the discharge end of the distributor above the average height of the receiving surface, in feet For example, a 6" diameter semi-cylindrical trough having a length of 10 inches, rotating at 150 RPM at a 30° angle, 18 inches above the receiving surface will spread 5,000 pounds per hour of ⅜" diameter gravel relatively evenly over a 5'0" square box.

It will be evident from the foregoing that various modifications can be made to the apparatus of this invention. Such, however, are considered within the scope of the invention.

I claim:
1. A distributor comprising:
   (a) an inlet conduit;
   (b) a vertical, rotatable shaft positioned centrally of said inlet conduit;
   (c) a semi-circular trough adapted to receive material introduced through said conduit and angularly affixed to said shaft to incline said trough to form an upper and lower end of said trough, said trough having an opening positioned centrally of its lower end; and,
   (d) closure means adapted to alter the size of said opening.
2. The distributor of claim 1 in which said opening has the shape of a truncated cone.
3. The distributor of claim 2 in which said cone has a base equal in length to about one-third of the periphery of said trough.
4. The distributor of claim 3 in which said cone has a truncated apex equal in length to about the diameter of said rotatable shaft.

* * * * *